United States Patent
Forchini et al.

[11] 3,712,631
[45] Jan. 23, 1973

[54] PIPE SEAL

[75] Inventors: James F. Forchini; Brian K. Herndon, both of Santa Rosa, Calif.

[73] Assignee: Ecodyne Cooling Products Company

[22] Filed: Aug. 2, 1971

[21] Appl. No.: 168,271

[52] U.S. Cl..............277/207, 277/226, 277/DIG. 2, 285/231, 285/DIG. 19
[51] Int. Cl............................F16j 15/10, F16l 21/02
[58] Field of Search.......285/230, 231, 345, DIG. 19; 277/207, 207 A, 34.3, 212, 226

[56] References Cited

UNITED STATES PATENTS

| | | | |
|---|---|---|---|
| 2,259,940 | 10/1941 | Nathan | 277/207 |
| 2,369,911 | 2/1945 | Lind et al. | 277/226 |
| 3,544,119 | 12/1970 | Glover | 277/207 A |
| 3,647,229 | 3/1972 | Grimes | 277/207 |

Primary Examiner—Samuel B. Rothberg
Assistant Examiner—Robert I. Smith
Attorney—Charles M. Kaplan et al.

[57] ABSTRACT

A sealing gasket for the joint between the sections of bell and spigot pipes. The sealing gasket has a substantially triangular transverse cross section and includes a hollow central cavity of substantially triangular transverse cross section. A vertical web divides the hollow central cavity into a pair of side cavities such that each side cavity has a cross sectional area in the range of 8 to 20 percent of the total cross sectional area of the gasket. A plurality of V-shaped ridges are integrally formed on the outer surface of the gasket.

11 Claims, 2 Drawing Figures

PATENTED JAN 23 1973 3,712,631

3,712,631

PIPE SEAL

BACKGROUND AND SUMMARY OF THE INVENTION

This invention relates to an improved seal for pipe joints and more particularly to an improved flexible seal for the joint between the sections of large diameter fiberglass bell and spigot pipes.

The seal of this invention finds particular application for the connection of large diameter fiberglass pipes of the type used in a water cooling tower distribution system. The seal is not, however, limited to such pipes nor to any particular size but it will be apparent from the following description that the seal is particularly advantageous for such piping in larger sizes wherein it provides a seal having controlled compression for continued sealing during longitudinal movement of the pipe.

In the past, sealing rings or gaskets have generally been of the lip seal type or of the O-ring type. Conventional lip seals, of the type known in the art, have the advantage of being relatively flexible and thus allow for vertical and horizontal mis-alignment of the pipe sections, but in so doing have to sacrifice high static sealing capability. Conventional O-ring seals, including those having hollow centers, have the advantage of providing a high static sealing capability but in so doing sacrifice the flexibility required to compensate for wide joint design tolerances associated with large diameter pipe sections. The improved seal of the present invention provides for a controlled compression in a manner which attains the flexibility of a lip seal and the high static sealing capability of an O-ring.

It is a primary object of the present invention to provide an improved flexible seal which when positioned between the telescoped ends of two pipes, affords a pipe joint that is leak-proof and still is able to compensate for both vertical and horizontal mis-alignment of the pipes as well as joint design variances.

A further object is to provide an improved seal to connect the ends of two pipes, that is flexible enough to compensate for both vertical and horizontal mis-alignment and joint design variances of the pipes and yet has controlled compression which results in a positive static sealing capability.

Another object of the present invention is to provide an improved high strength pipe joint which may be quickly and easily assembled and which permits the pipes to linearly expand and contract without disturbing the joint.

A still further object of the present invention is to provide an improved flexible seal for use in connecting the ends of two large diameter fiberglass pipes which provides for the above-mentioned objects and further provides means for the sealing of localized surface roughness of the pipes.

The pipe joint of the present invention includes a first pipe having an enlarged hub portion at its end and a second pipe telescopically received in the hub portion of the first pipe, having a circumferential recess for receiving and combining an annular sealing gasket. The sealing gasket has a substantially triangular transverse cross section and includes a hollow central cavity of substantially triangular transverse cross section. A vertical web divides the hollow central cavity into a pair of side cavities such that each side cavity has a cross sectional area in the range of 8 to 20 percent of the total cross sectional area of the gasket. A plurality of V-shaped ridges are integrally formed on the outer surface of the gasket for sealing of localized surface roughness of the pipes. This triangular transverse section is revolved 360° to form a one-piece annular gasket seal.

DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

DESCRIPTION OF A PREFERRED EMBODIMENT

Figure 1:
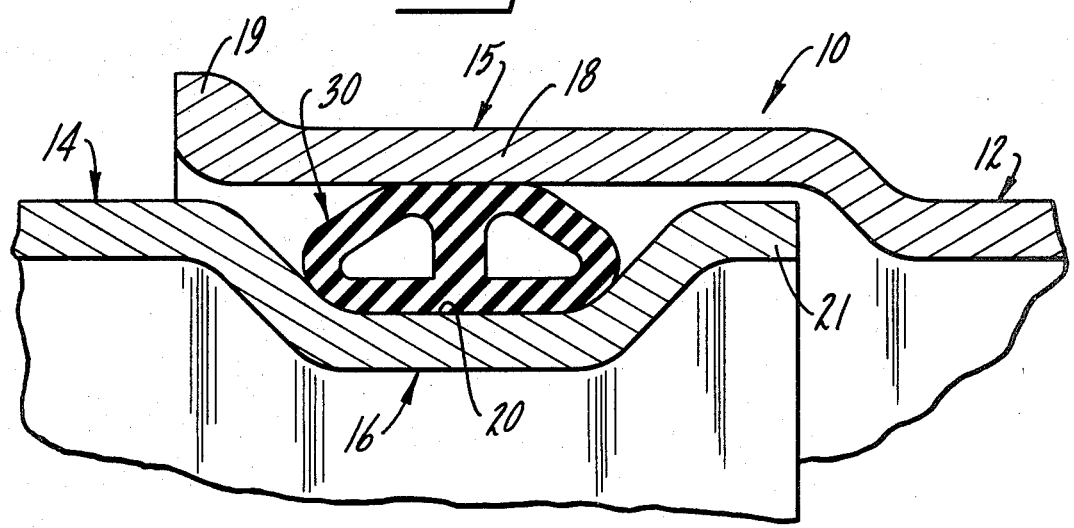
FIG. 1 shows in axial section, a pipe connection in accordance with the present invention.

Referring now to the drawings and more particularly to FIG. 1, an improved pipe joint of the present invention is shown generally at 10. This joint 10 is formed between the cylindrical pipes 12 and 14 by telescoping their end portions 15 and 16, respectively, together so that the end portion 15 of pipe 12 overlaps the end portion 16 of pipe 14.

As is apparent from FIG. 1, the end portion 15 of pipe 12 has an enlarged hub 18 formed thereon that receives therein the end 16 of pipe 14. The inner diameter of hub 18 is slightly larger than the outer diameter of pipe 14. The leading edge of end portion 15 is beveled outwardly at 19 to facilitate the initial entry of end portion 16 therein. The end portion 16 of pipe 14 has the same diameter as the remainder of pipe 14 with the exception of an annular recess 20 formed therein close to the leading edge indicated at 21. Recess 20 provides a space between the end portion 16 of pipe 14 and the hub 18 of pipe 12 for the confinement of the improved annular sealing ring or gasket 30 of the present invention.

Figure 2:
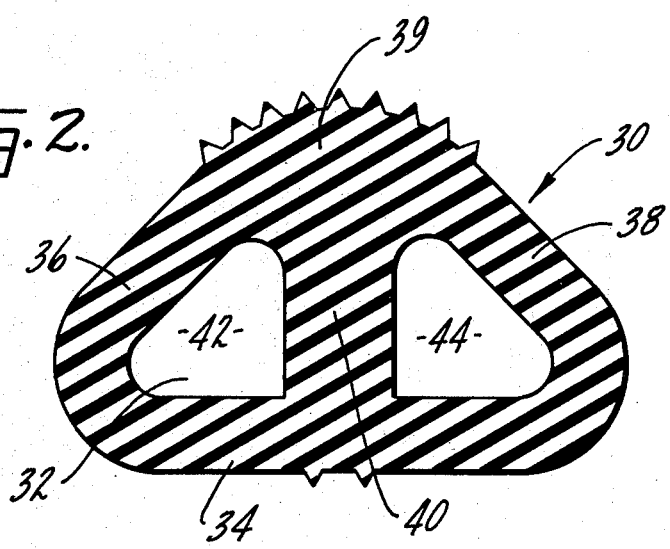
FIG. 2 is an enlarged transverse sectional view illustrating the improved gasket seal of the invention in its unsealed form.

As seen in FIG. 2, the cross sectional shape of the outer surface of gasket 30 may be generally described as an isosceles triangle having rounded corners. A hollow annular central cavity 32 is formed within gasket 30 having a similarly cross sectional isosceles triangular shape. Gasket 30 thus includes a base portion 34 and a pair of side portions 36 and 38 integrally connected to and extending upward from the respective ends of base portion 34 to converge at rounded apex point 39. In the preferred embodiment illustrated in FIG. 2, the included angles between base portion 34 and side portions 36 and 38 are approximately 45 degrees.

An internal vertical web portion 40, formed integral with gasket 30, extends from substantially the middle of base portion 34 to apex 39 so as to divide central cavity 32 into a pair of side cavities 42 and 44. The thickness of portion 40 is greater than the thickness of base portion 34 and side portions 36 and 38. Side cavities 42 and 44 each have a cross sectional area in the range of 8 to 20 percent, preferably about 13 percent, of the total cross sectional area of gasket 30; for reasons which will hereinafter become more apparent.

As seen in FIG. 2, a plurality of V-shaped ridges 50 are integrally formed circumferentially about the outer surface of gasket 30 at apex 39 and at approximately the middle of base portion 34. This is to increase the sealing capability of gasket 30 when localized surface roughness is present in the pipes. Gasket 30 is preferrably made of composition rubber or neoprene. Other well known rubber substitutes having the same or improved properties as rubber with respect to elasticity, stretch, flow and density may also be utilized to make gasket 30.

A brief description of the assembly and operation of joint 10 of the present invention follows to help describe the advantages of the subject pipe joint. Gasket 30 is initially positioned within recess 20 of pipe 14 with base portion 34 resting upon the external surface of recess 20, as seen in FIG. 1. The internal diameter of gasket 30 is preferably slightly less than the outside diameter of the external surface of recess 20 and therefore gasket 30 must be stretched sufficiently to permit gasket 30 to be fitted over edge 21 and positioned in cooperating recess 20. With gasket 30 positioned within recess 20, the end portion 16 of pipe 14 is inserted into end portion 15 of pipe 12. The internal surface of hub portion 18 is spaced from the external surface of recess 20 by a predetermined distance such that gasket 30 is forced into tight contact with the external surface of recess 20 and is compressed so as to grip tightly the internal surface of hub portion 18. End portion 16 is positioned within end portion 15 such that edge 21 is at the inner end of hub portion 18. The sides of recess 20 are preferably flared outward to provide room for the gasket material to flow when compressed by the insertion of end portion 16 into hub portion 15.

The unique design of gasket 30 provides for a controlled compression and yet still permits lateral displacement of the upper portion of gasket 30. Web portion 40 is of sufficient thickness, approximately 50 percent thicker than side portions 36 and 38, to result in a positive static sealing capability. Side cavities 42 and 44, comprising approximately 13 percent of the total cross sectional area of gasket 30, permits lateral displacement of the upper portions of side portions 36 and 38 to provide for continued sealing during longitudinal movement of pipes 12 and 14. The combination of the above two features permits pipe joint 10 of the present invention to function satisfactorily despite vertical and horizontal mis-alignment of pipes 12 and 14. External ridges 50 provide for continued sealing of localized surface roughness of the pipes. This is particularly important when joining together large diameter fiberglass pipe.

It will be seen that an improved pipe assembly has been provided including an improved gasket seal cooperating therewith in forming a sealed pipe joint. The improved pipe joint assembly is particularly useful for larger pipes such as fiberglass, ceramic or cement pipes as it is easily assembled without requiring any special precautions or any particular skills. This adapts the joint for providing quickly made and tight seals even where the size or weight of the pipes makes precision handling or alignment difficult or impossible and it also adopts the new joint assembly for use under widely varying field conditions.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A flexible gasket type seal for use in coupling together the adjacent ends of two pipes; comprising:
   a. an annular gasket, having a substantially triangular cross section, including a hollow annular central cavity of substantially triangular cross section, said gasket when viewed in cross section having a base portion and a pair of side portions extending upward from the respective ends of said base portion to converge at an apex point; and
   b. a vertical internal web portion extending from substantially the middle of said base portion to said apex so as to divide said central cavity into a pair of side cavities.

2. The invention of claim 1 wherein each of said side cavities have a cross sectional area in the range of 8 to 20 percent of the cross sectional area of said gasket, such that said side cavities permit lateral displacement of the outer portion of said gasket and said web portion provides for controlled compression of said seal.

3. The invention of claim 2 wherein a plurality of V-shaped ridges are integrally formed on the outer surface of said gasket for sealing of localized surface roughness of the pipes.

4. The invention of claim 2 wherein the thickness of said web portion is approximately 50 percent greater than the thickness of said side portions.

5. The invention of claim 4 wherein said gasket is formed from a synthetic elastomeric type material.

6. The invention of claim 2 wherein said gasket and said central cavity have a cross sectional shaped of an isosceles triangle.

7. In a pipe joint comprising a first pipe having an enlarged hub portion at its end, and a second pipe telescopically received in the hub portion of the first pipe having a circumferential recess for receiving a sealing gasket; an improved sealing gasket, comprising:
   a. an annular flexible gasket, having a substantially triangular cross section, substantially filling and confined within said recess and including a pair of hollow annular side cavities of substantially triangular cross section, said gasket when viewed in cross section having a base portion and a pair of side portions extending upward from the respective ends of said base portion to converge at an apex point; and
   b. a vertical internal web portion extending from substantially the middle of said base portion to said apex so as to divide said central cavity into a pair of side cavities;
   c. the unconfined internal diameter of said gasket being less than the external diameter of said recess in the second pipe and the unconfined external diameter of said gasket being greater than the internal diameter of said hub portion of the first pipe such that as said second pipe is received by said first pipe said gasket is compressed within said recess to effect a fluid seal therebetween.

8. The invention of claim 7 wherein said base portion is positioned to contact the external surface of said recess and said side portions adjacent said apex being positioned to contact the internal surface of said hub portion.

9. The invention of claim 8 wherein each of said side cavities have a cross sectional area in the range of 8 to 20 percent of the cross sectional area of said gasket, such that said side cavities permit lateral displacement of the outer portion of said gasket and said web portion provides for controlled compression of said gasket.

10. The invention of claim 9 wherein said recess has outwardly flared sidewalls to provide for the flow of gasket material when said gasket is compressed within said recess.

11. The invention of claim 9 wherein the thickness of said web portion is approximately 50 percent greater than the thickness of said side portions.

* * * * *